(12) United States Patent
Yu et al.

(10) Patent No.: US 9,189,420 B2
(45) Date of Patent: Nov. 17, 2015

(54) WEAR-LEVELING METHOD, STORAGE DEVICE, AND INFORMATION SYSTEM

(71) Applicants: Huawei Technologies Co., Ltd., Shenzhen, Guangdong (CN); Tsinghua University, Beijing (CN)

(72) Inventors: Hongliang Yu, Beijing (CN); Yuyang Du, Beijing (CN); Hao Gong, Shenzhen (CN)

(73) Assignees: Huawei Technologies Co., Ltd., Shenzhen (CN); Tsinghua University, Beijing (CN)

( * ) Notice: Subject to any disclaimer, the term of this patent is extended or adjusted under 35 U.S.C. 154(b) by 72 days.

(21) Appl. No.: 13/903,774

(22) Filed: May 28, 2013

(65) Prior Publication Data

US 2013/0254514 A1    Sep. 26, 2013

Related U.S. Application Data

(63) Continuation of application No. PCT/CN2012/077403, filed on Jun. 25, 2012.

(30) Foreign Application Priority Data

Jun. 24, 2011    (CN) .......................... 2011 1 0172809

(51) Int. Cl.
*G06F 12/00* (2006.01)
*G06F 12/10* (2006.01)
*G06F 12/02* (2006.01)

(52) U.S. Cl.
CPC .......... *G06F 12/109* (2013.01); *G06F 12/0246* (2013.01); *G06F 2212/7211* (2013.01)

(58) Field of Classification Search
USPC .................. 711/202, 206, 207, 209
See application file for complete search history.

(56) References Cited

U.S. PATENT DOCUMENTS 7,457,909 B2    11/2008    Di Sena et al.
7,552,272 B2    6/2009    Gonzalez et al.

FOREIGN PATENT DOCUMENTS

CN    101101569 A    1/2008
WO    WO 2011/065957 A1    6/2011

OTHER PUBLICATIONS

Nak Hee Seong, et al., "Security Refresh: Protecting Phase-Change Memory Against Malicious Wear Out", IEEE, Feb. 1, 2011, p. 119-127.

(Continued)

*Primary Examiner* — Jared Rutz
*Assistant Examiner* — Hamdy S Ahmed (57) ABSTRACT

Embodiments of the present invention provide a wear-leveling method, a storage device, and an information system, where a storage region is divided into a plurality of storage sub-regions of the same size. The method includes: recording the accumulated number of write operations of each storage sub-region; and when the accumulated number of write operations of any one storage sub-region of the plurality of storage sub-regions reaches a predetermined remapping rate, mapping a logical address of the storage sub-region to a remapping physical address. With the wear-leveling method, the storage device, and the information system in the embodiments of the present invention, a logical address of a local data block on which too many write operations are performed may be evenly mapped to an overall physical storage region, thereby avoiding that local data is too hot and prolonging a service life of a storage medium.

15 Claims, 7 Drawing Sheets

(56) References Cited

OTHER PUBLICATIONS

Nak Hee Seong, et al., "Security Refresh", ISCA'10, Jan. 1, 2010, p. 383-394.
International Search Report dated Oct. 18, 2012 in connection with International Patent Application No. PCT/CN2012/077403.
"Proceedings of the 42nd Annual IEEE/ACM International Symposium on Microarchitecture", Dec. 12-16, 2009, 13 pages.
Moinuddin K. Qureshi, et al., "Enhancing Lifetime and Security of PCM-Based Main Memory with Start-Gap Wear Leveling", MICRO '09, Dec. 12-16, 2009, 10 pages.
Nak Hee Seong, et al., "Security Refresh: Prevent Malicious Wearout and Increase Durability for Phase-Change Memory with Dynamically Randomized Address Mapping", ISCA'10, Jun. 19-13, 2010, p. 383-394.

WEAR-LEVELING METHOD, STORAGE DEVICE, AND INFORMATION SYSTEM

CROSS-REFERENCE TO RELATED APPLICATIONS

This application is a continuation of International Application No. PCT/CN2012/077403, filed on Jun. 25, 2012, which claims priority to Chinese Patent Application No. 201110172809.9, filed on Jun. 24, 2011, both of which are hereby incorporated by reference in their entireties.

TECHNICAL FIELD

Embodiments of the present invention relate to the field of storage technologies, and in particular, to a wear-leveling method, a storage device, and an information system.

BACKGROUND

In recent years, a new storage technology—a phase-change memory (Phase-Change Memory, PCM) gradually shows a potential of replacing a dynamic random access memory, so that the phase-change memory is highly concerned in the industry. Compared with the dynamic random access memory, the phase-change memory mainly has two major advantages. One is that the phase-change memory is highly integrated and has strong expandability, and the other is that the phase-change memory is energy-saving.

However, a storage unit of the phase-change memory can bear only a certain number of write operations, which is generally around 105 to 108. When the number of write operations exceeds this number, a stuck-at fault (Stuck-at Fault) occurs to the storage unit, so that a new write request cannot change an original written state, and the storage unit is permanently stuck at an originally data written state. A major reason is that after the number of write operations exceeds a certain number, due to frequent expansion and contraction, a heating resistor falls off, so that the storage unit can no longer change a phase state, that is, new data can no longer be written into the storage unit, but a read operation may still be performed on originally-written data.

SUMMARY

Embodiments of the present invention provide a wear-leveling method, a storage device, and an information system, which may map a logical address of a local data block on which too many write operations are performed to an overall physical storage region, thereby avoiding that local data is too hot and prolonging a service life of a phase-change memory.

An embodiment of the present invention provides a wear-leveling method, where a storage region is divided into a plurality of storage sub-regions of the same size, each storage sub-region is divided into a plurality of storage blocks of the same size, each storage block corresponds to one logical address and one physical address, and there is a unique mapping between the logical address and the physical address. The method includes: recording the accumulated number of write operations of each storage sub-region; and when the accumulated number of write operations of anyone storage sub-region of the plurality of storage sub-regions reaches a predetermined remapping rate, mapping a logical address of the storage sub-region to a remapping physical address.

An embodiment of the present invention provides a storage device, which includes: a storage region, where the storage region includes a plurality of storage sub-regions of the same size, each storage sub-region includes a plurality of storage blocks of the same size, each storage block corresponds to one logical address and one physical address, and there is a unique mapping between the logical address and the physical address; a recording unit, configured to record the accumulated number of write operations of each storage sub-region; and a remapping unit, configured to, when the accumulated number of write operations of any one storage sub-region of the plurality of storage sub-regions reaches a predetermined remapping rate, map a logical address of the storage sub-region to a remapping physical address.

An embodiment of the present invention provides an information system, which includes a central processor and at least one storage device as described in the foregoing, where the central processor is configured to control the storage device, and the storage device is configured to store or access information according to an instruction of the central processor.

With the wear-leveling method, the storage device, and the information system in the embodiments of the present invention, a logical address of a local data block on which too many write operations are performed may be mapped to an overall physical storage region, thereby avoiding that local data is too hot and prolonging a service life of a storage medium.

BRIEF DESCRIPTION OF DRAWINGS

To describe the technical solutions in the embodiments of the present invention more clearly, the following briefly introduces the accompanying drawings required for describing the embodiments. Apparently, the accompanying drawings in the following description show some embodiments of the present invention, and persons of ordinary skill in the art may still derive other drawings from these accompanying drawings without creative efforts.

DESCRIPTION OF EMBODIMENTS

To make the objectives, technical solutions, and advantages of the embodiments of the present invention more comprehensible, the following clearly describes the technical solutions in the embodiments of the present invention with reference to the accompanying drawings in the embodiments of the present invention. Apparently, the embodiments to be described are merely a part rather than all of the embodiments of the present invention. All other embodiments obtained by persons of ordinary skill in the art based on the embodiments of the present invention without creative efforts shall fall within the protection scope of the present invention.

In a wear-leveling method provided in an embodiment of the present invention, a logical address region of a storage region is divided into a plurality of storage sub-regions of the same size, where each storage sub-region includes a plurality of storage blocks, and each storage sub-region can be remapped to an overall physical address region. Remapping of a plurality of storage sub-regions may be simultaneously performed. If remapping of all storage blocks in one storage sub-region is completed, the storage sub-region immediately enters a next remapping round and continues to be remapped. With this concurrent wear-leveling method, remapping of a storage block occurs to a most "necessary" part, that is, a logical address of a storage block on which a maximum of write operations are performed or a logical address of a worst worn storage block, and a physical address to which a logical address of each storage block may be mapped is not limited to any one physical sub-address region.

TABLE 1

Chinese-English comparison table of storage configuration parameters

| Chinese Parameter | English Comparison Parameter |
|---|---|
| Size of a storage region | Region Size |
| Size of a storage sub-region | Sub-region Size |
| The number of storage sub-regions | Sub-region Number |
| Block size | Block Size |
| The number of blocks in each storage region | Block Number per Region |
| The number of blocks in each storage sub-region | Block Number per Sub-region |

Figure 1:
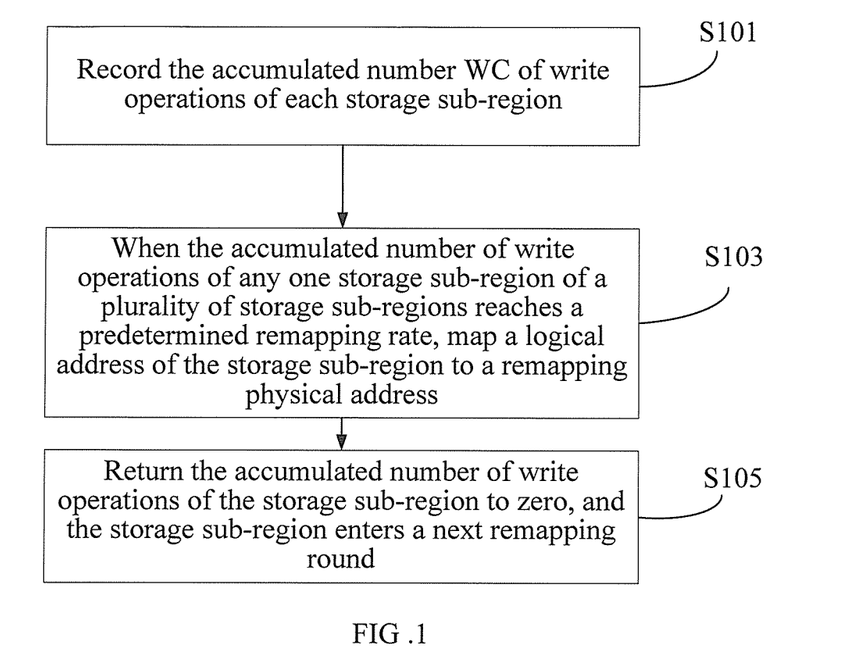
FIG. 1 is a flow chart of a wear-leveling method according to a first embodiment of the present invention.

FIG. 1 is a flow chart of a wear-leveling method according to a first embodiment of the present invention. The method is applied to a storage medium, for example, a phase-change memory and a flash memory. A storage region of the storage medium is divided into a plurality of storage sub-regions of the same size, each storage sub-region is divided into a plurality of storage blocks of the same size, each storage block corresponds to one logical address and one physical address, and there is a unique mapping between the logical address and the physical address. The plurality of storage sub-regions of the same size may be continuous, and the plurality of storage blocks of the same size may be continuous. A division operation on the storage region may be completed when the storage medium is produced, and parameters of the storage region are initialized at the same time, for example:

the total number of storage blocks: N;
the number of storage blocks included in each logical sub-region: n;
logical sub-region: lsr0, lsr1, lsr2, lsr3, . . . , lsr(N/n−1); and
physical sub-region: psr0, psr1, psr2, psr3, . . . , psr(N/n−1).

As shown in FIG. 1, the method in this embodiment includes:

Step S101: Record the accumulated number WC of write operations of each storage sub-region.

Step S103: When the accumulated number of write operations of anyone storage sub-region of the plurality of storage sub-regions reaches a predetermined remapping rate, for example, 100, map a logical address of the storage sub-region to a remapping physical address.

Step S105: Return the accumulated number WC of write operations of the storage sub-region to zero, and the storage sub-region enters a next remapping round.

Specifically, step S101 may include: setting a counter for each storage sub-region separately, where the counter is used to record the accumulated number of write operations of each storage sub-region; and determining, according to an address (a logical address or a physical address) of a storage block that corresponds to each write operation, a storage sub-region to which the storage block belongs, and adding 1 to a counter that corresponds to the storage sub-region, so as to record the accumulated number of write operations of the storage sub-region.

Specifically, step S103 may include: generating a remapping key for the storage sub-region; and performing an XOR operation on a logical address of the storage sub-region and the remapping key to obtain a remapping physical address of the storage sub-region, thereby implementing mapping of the logical address of the storage sub-region to the remapping physical address.

In this embodiment of the present invention, address remapping of a plurality of storage sub-regions may be simultaneously performed. If remapping of all storage blocks in one storage sub-region is completed, the storage sub-region immediately enters a next remapping round and continues to be remapped. In this embodiment of the present invention, the address remapping of the plurality of storage sub-regions is concurrently performed in a multi-way manner, so that a wear-leveling speed may be faster.

In this embodiment of the present invention, the accumulated number of write operations of each storage sub-region is recorded, and when the accumulated number of write operations of any one storage sub-region of a plurality of storage sub-regions reaches a predetermined remapping rate, a logical address of the storage sub-region is mapped to a remapping physical address, so that a logical address of a local data block on which too many write operations are performed may be evenly mapped to an overall physical storage region, thereby avoiding that local data is too hot and prolonging a service life of a storage medium.

Figure 2:
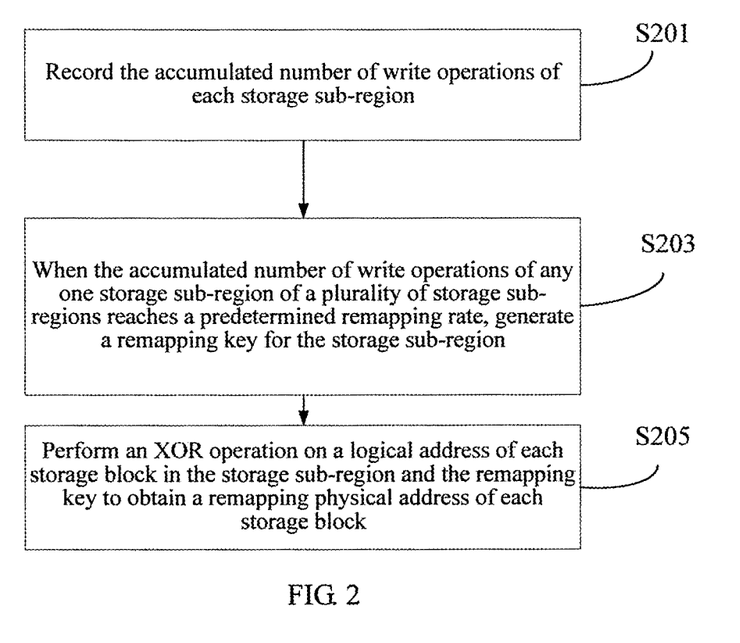
FIG. 2 is a flow chart of a wear-leveling method according to a second embodiment of the present invention.

FIG. 2 is a flow chart of a wear-leveling method according to a second embodiment of the present invention. The method is applied to a storage medium, for example, a phase-change memory and a flash memory. In this embodiment of the present invention, a logical address of a storage block in a storage sub-region includes a storage sub-region key and a storage block key, where the storage sub-region key is used to identify the storage sub-region, and the storage block key is used to identify the storage block in the storage sub-region. The wear-leveling method in this embodiment includes:

Step S201: Record the accumulated number of write operations of each storage sub-region.

Step S203: When the accumulated number of write operations of any one storage sub-region of a plurality of storage sub-regions reaches a predetermined remapping rate, generate a remapping key for the storage sub-region, where the number of bits of the remapping key is the same as the number of bits of a logical address of a storage block in the storage sub-region.

Specifically, the logical address of the storage block in the storage sub-region is represented by a binary number string MA whose length is $Log_2 N$. Consecutive $Log_2(N/n)$ bits in the MA are a storage sub-region key, and consecutive $Log_2 n$ bits in the MA are a storage block key. For example, the first $Log_2(N/n)$ bits in the MA are the storage sub-region key, and the last $Log_2(N/n)$ bits in the MA are the storage block key, where N is the total number of storage blocks in a storage region, and n is the number of storage blocks in each storage sub-region.

Specifically, step S203 includes: generating a remapping key for the storage sub-region, where the length of the remapping key is $Log_2 N$.

Step 205: Perform an XOR operation on a logical address of each storage block in the storage sub-region and the remapping key to obtain a remapping physical address of each storage block, thereby implementing mapping of a logical address of the storage sub-region to a remapping physical address.

Specifically, step S205 includes: performing an XOR operation on a logical address MA of each storage block in the storage sub-region and the remapping key to obtain a remapping physical address RMA of each storage block, that is, RMA=MA XOR Key, where XOR represents the XOR operation.

In this embodiment of the present invention, address remapping of a plurality of storage sub-regions may be simultaneously performed. If remapping of all storage blocks in one storage sub-region is completed, the storage sub-region immediately enters a next remapping round and continues to be remapped. In this embodiment of the present invention, the address remapping of the plurality of storage sub-regions is concurrently performed in a multi-way manner, so that a wear-leveling speed may be faster.

In this embodiment of the present invention, the accumulated number of write operations of each storage sub-region is recorded, and when the accumulated number of write operations of any one storage sub-region of a plurality of storage sub-regions reaches a predetermined remapping rate, a logical address of the storage sub-region is mapped to a remapping physical address, so that a logical address of a local data block on which too many write operations are performed may be evenly mapped to an overall physical storage region, thereby avoiding that local data is too hot and prolonging a service life of a storage medium.

Figure 3:
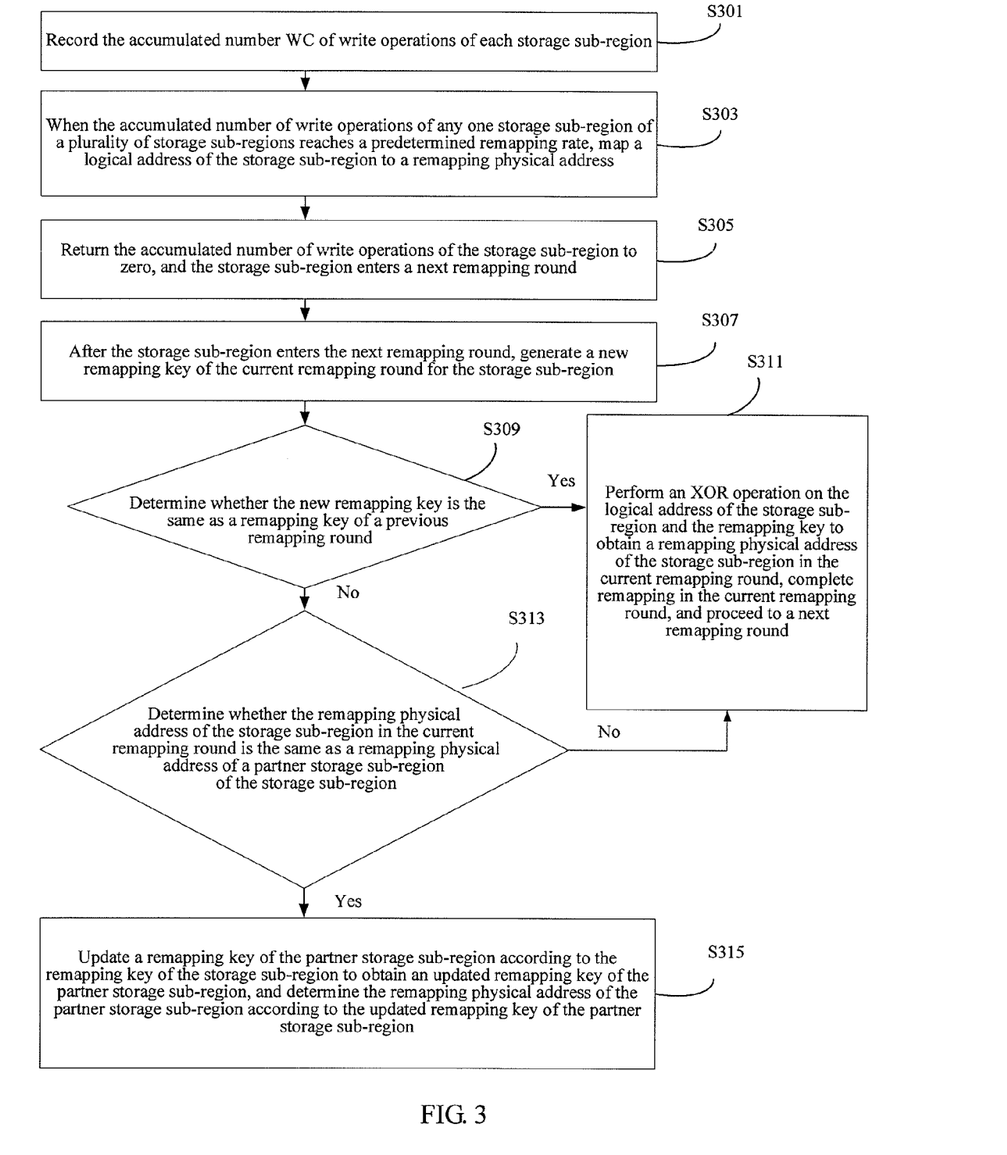
FIG. 3 is a flow chart of a wear-leveling method according to a third embodiment of the present invention.

FIG. 3 is a flow chart of a wear-leveling method according to a third embodiment of the present invention. The method is applied to a storage medium, for example, a phase-change memory and a flash memory. As shown in FIG. 3, the method in this embodiment includes:

Step S301: Record the accumulated number of write operations of each storage sub-region.

Step S303: When the accumulated number of write operations of any one storage sub-region of a plurality of storage sub-regions reaches a predetermined remapping rate, map a logical address of the storage sub-region to a remapping physical address.

After a current remapping round is completed, the method further includes:

Step S305: Return the accumulated number of write operations of the storage sub-region to zero, and the storage sub-region enters a next remapping round.

Step S307: After the storage sub-region enters the next remapping round, generate a new remapping key of the current remapping round for the storage sub-region.

Step S309: Determine whether the new remapping key is the same as a remapping key of a previous remapping round, when the two are the same, perform step S311, and when the two are not the same, perform step S313.

Step S311: Perform an XOR operation on the logical address of the storage sub-region and the remapping key to obtain a remapping physical address of the storage sub-region in the current remapping round, complete remapping in the current remapping round, and proceed to a next remapping round.

Step S313: Determine whether the remapping physical address of the storage sub-region in the current remapping round is the same as a remapping physical address of a partner storage sub-region of the storage sub-region, if the two are the same, perform step S315, and if the two are not the same, perform step S311, where if two logical sub-regions are mapped, through XOR mapping, to a physical address of the same block, the two logical sub-regions are partner storage sub-regions to each other.

Step S315: Update a remapping key of the partner storage sub-region according to the remapping key of the storage sub-region to obtain an updated remapping key of the partner storage sub-region, and determine the remapping physical address of the partner storage sub-region according to the updated remapping key of the partner storage sub-region.

In this embodiment of the present invention, address remapping of a plurality of storage sub-regions may be simultaneously performed. If remapping of all storage blocks in one storage sub-region is completed, the storage sub-region immediately enters a next remapping round and continues to be remapped. In this embodiment of the present invention, the address remapping of the plurality of storage sub-regions is concurrently performed in a multi-way manner, so that a wear-leveling speed may be faster.

In this embodiment of the present invention, the accumulated number of write operations of each storage sub-region is recorded, and when the accumulated number of write operations of any one storage sub-region of a plurality of storage sub-regions reaches a predetermined remapping rate, a logical address of the storage sub-region is mapped to a remapping physical address, so that a logical address of a local data block on which too many write operations are performed may be evenly mapped to an overall physical storage region, thereby avoiding that local data is too hot and prolonging a service life of a storage medium.

Figure 4:
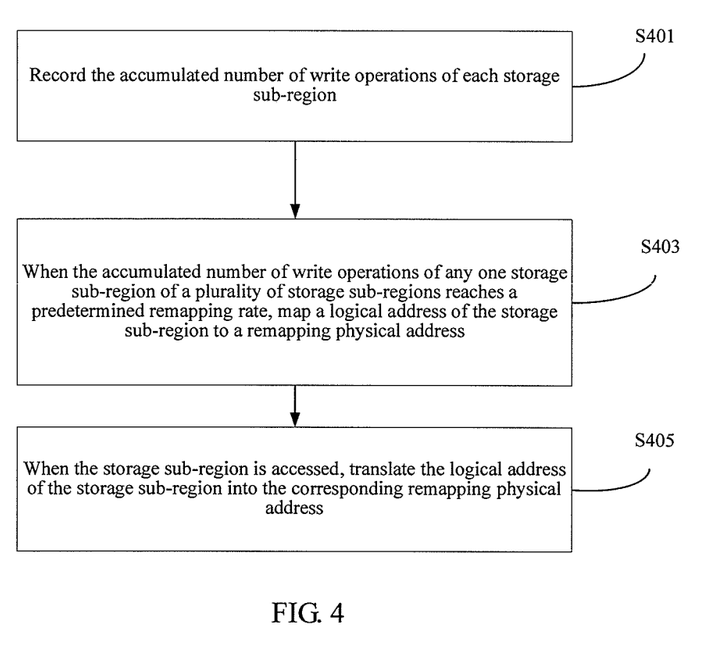
FIG. 4 is a flow chart of a wear-leveling method according to a fourth embodiment of the present invention.

FIG. 4 is a flow chart of a wear-leveling method according to a fourth embodiment of the present invention. The method is applied to a storage medium, for example, a phase-change memory and a flash memory. As shown in FIG. 4, the method in this embodiment includes:

Step S401: Record the accumulated number of write operations of each storage sub-region.

Step S403: When the accumulated number of write operations of any one storage sub-region of a plurality of storage sub-regions reaches a predetermined remapping rate, map a logical address of the storage sub-region to a remapping physical address.

Step S405: When the storage sub-region is accessed, translate the logical address of the storage sub-region into the corresponding remapping physical address, which specifically includes:

determining a logical address of a storage sub-region to which an access operation address belongs; and translating the logical address of the storage sub-region into a physical block address.

Specifically, step S405 may include:

First, determine a physical address lb.pbp to which the logical address LBA of the storage sub-region is mapped in a previous mapping round, where lb.pbp=lb XOR lsr.keys.pr, where lb is a logical address of a logical block, and lsr.keys.pr is a value of a remapping key of the previous remapping round.

Determine a physical address lb.pbc to which the logical address of the storage sub-region is mapped in a current mapping round, where lb.pbc=lb XOR lsr.keys.cr.

Therefore, if address remapping of the storage sub-region or a partner storage sub-region of the storage sub-region is completed in the current remapping round, the physical block address that is obtained after the translation is the physical address lb.pbc to which the logical address of the storage sub-region is mapped in the current remapping round; otherwise, the physical block address that is obtained after the translation is the physical address lb.pbp to which the logical address of the storage sub-region is mapped in the previous remapping round.

In this embodiment of the present invention, address remapping of a plurality of storage sub-regions may be simultaneously performed. If remapping of all storage blocks in one storage sub-region is completed, the storage sub-region immediately enters a next remapping round and continues to be remapped. In this embodiment of the present invention, the address remapping of the plurality of storage sub-regions is concurrently performed in a multi-way manner, so that a wear-leveling speed may be faster.

In this embodiment of the present invention, the accumulated number of write operations of each storage sub-region is recorded, and when the accumulated number of write operations of any one storage sub-region of a plurality of storage sub-regions reaches a predetermined remapping rate, a logical address of the storage sub-region is mapped to a remapping physical address. When the storage sub-region is accessed, the logical address of the storage sub-region is translated into the corresponding remapping physical address, thereby implementing translation of the logical address of the storage sub-region after the remapping and completing an access operation.

An address remapping algorithm and an address translation algorithm in the wear-leveling method in this embodiment of the present invention are described in detail in the following. First, a data structure is defined.

A logical address of a storage sub-region is as follows:

```
struct lsr {
    uint64_t cr;
    uint64_t lr;
    uint64_t crp;
    uint64_t wc;
    uint64_t keys[2];
    uint64_t total_round;
};
```

A data structure of the storage sub-region includes a round number (cr) of a current remapping round and a round number (lr) of a previous mapping round, which are used to extract remapping keys of the current remapping round and the previous remapping round, a current remapping pointer (crp), the accumulated number (wc) of write operations of the storage sub-region, remapping keys (keys) of the storage sub-region, and so on.

A physical address of the storage sub-region is as follows:

```
struct psr {
    uint64_t clsr;
};
```

A data structure of the physical address of the storage sub-region includes a current logical address number (clsr), which is used to find a logical address that currently corresponds to the physical address of the storage sub-region.

A global structure of multi-way wear leveling is as follows.

```
struct multi-way {
    struct lsr *lsrs;
    struct psr *psrs;
    uint64_t writes;
    uint64_t swaps;
    uint64_t refreshes;
} mw;
```

The global structure of multi-way wear leveling includes a logical address array (*lsrs) of the storage sub-region, a physical address array (*psrs) of the storage sub-region, the total number of write operations, that is, writes, the total number of block swaps, that is, swaps, the total number of remapping rounds, that is, refreshes, and so on.

The address remapping algorithm in the wear-leveling method in this embodiment of the present invention is shown as the following pseudo-codes.

```
REMAP ALGORITHM
CR = LSR->CR
LR = LSR->LR
IF CR = LR
    CR = (LR + 1) % 2
    LSR->KEYS[CR] = RANDOMLY GENERATED KEY
ENDIF
LOG_ADD = LSR->CRP
PHY_ADD = LOG_ADD XOR LSR->KEYS[CR]
PSR = FIND_PSR(PHY_ADD)
PSR_CLSR = PSR->CLSR
VICTIM_PHY_ADD = LOG_ADD XOR LSR->KEYS[LR]
VICTIM_PSR = FIND_PSR(VICTIM_PHY_ADD)
VICTIM_PSR_CLSR = VICTIM_PSR->CLSR
PSR_CLSR_PSR_CLSR = PSR_CLSR XOR
    PSR_CLSR->KEYS[PSR_CLSR->CR]->CLSR
    IF PSR_CLSR = LSR
        VICTIM_LSR = VICTIM_PSR_CLSR
        VICTIM_LR = VICTIM_LSR->LR
        VICTIM_CR = VICTIM_LSR->CR
        VICTIM_LOG_ADD = PHY_ADD XOR VICTIM_LSR->KEYS[VICTIM_LR]
        IF VICTIM_LOG_ADD < VICTIM_LSR->CRP) {
            /* ALREADY REMAPPED */
            UPDATE LSR AND VICTIM_LSR
        ELSE
            SWAP PHY_ADD AND VICTIM_PHY_ADD
            UPDATE LSR AND VICTIM_LSR
```

```
        ENDIF
        ELSE IF PSR_CLSR->LR = PSR_CLSR ->CR OR(PSR_CLSR->CRP=
PSR_CLSR
* BLOCK_NUM_PER_SUBREGION AND PSR_CLSR IS NOT PSR_CLSR_PSR_CLSR)
        PSR->CLSR = LSR
        VICTIM_LSR = PSR_CLSR
        VICTIM_LR = VICTIM_LSR->LR
        VICTIM_CR = (VICTIM_LR + 1) % 2
        VICTIM_LSR->CR = VICTIM_CR
        VICTIM_LSR->KEYS[VICTIM_CR] = LSR->KEYS[CR] XOR
LSR->KEYS[LR] XOR VICTIM_LSR->KEYS[VICTIM_LR]
        VICTIM_LOG_ADD = PHY_ADD XOR VICTIM_LSR->KEYS[VICTIM_LR]
        VICTIM_PSR->CLSR = VICTIM_LSR
        SWAP PHY_ADD AND VICTIM_PHY_ADD
        UPDATE LSR AND VICTIM_LSR
        ELSE
          REFRESH PSR_CLSR
        ENDIF
```

An UPDATE algorithm is described as follows.

```
UPDATE ALGORITHM
LSR->CRP++;
IF LSR->CRP = LSR OVERFLOW
    LSR->CRP = FIRST ADDRESS IN THE LOGICAL SUB-REGION
    LSR->LR = (LSR->LR + 1) % 2
    IF LSR IS NOT VICTIM_LSR
        VICTIM_LSR->CRP = FIRST ADDRESS IN THE VICTIM
        LSR
        VICTIM_LSR->LR = (VICTIM_LSR->LR + 1) % 2
ENDIF
```

The address translation algorithm in the wear-leveling method in this embodiment of the present invention is described as follows.

```
    TRANSLATE ALGORITHM
    LSR = FIND_LSR(LOG_ADD)
    PHY_ADD_CUR = LOG_ADD XOR LSR->KEYS[LSR->CR]
    PHY_ADD_PRE = LOG_ADD XOR LSR->KEYS[LSR->LR]
    IF LSR->LR = LSR->CR
      RETURN PHY_ADD_PRE
    ELSE
      PSR_CUR = FIND_PSR(PHY_ADD_CUR)
      PSR_CUR_CLSR = PSR_CUR->CLSR
      IF PSR_CUR_CLSR = LSR
        IF LOG_ADD < LSR->CRP
          RETURN PHY_ADD_CUR
        ELSE
          PSR_PRE = FIND_PSR(PHY ADD_PRE)
          PSR_PRE_CLSR = PSR_PRE->CLSR
          VICTIM_LSR = PSR_PRE_CLSR
          VICTIM_LOG_ADD = PHY_ADD_CUR XOR
VICTIM_LSR->KEYS[VICTIM_LSR->LR]
            IF VICTIM_LOG_ADD < VICTIM_LSR->CRP
              RETURN PHY_ADD_CUR
            ELSE
              RETURN PHY_ADD_PRE
            ENDIF
        ENDIF
      ELSE
        RETURN PHY_ADD_PRE
      ENDIF
    ENDIF
```

Figure 5:
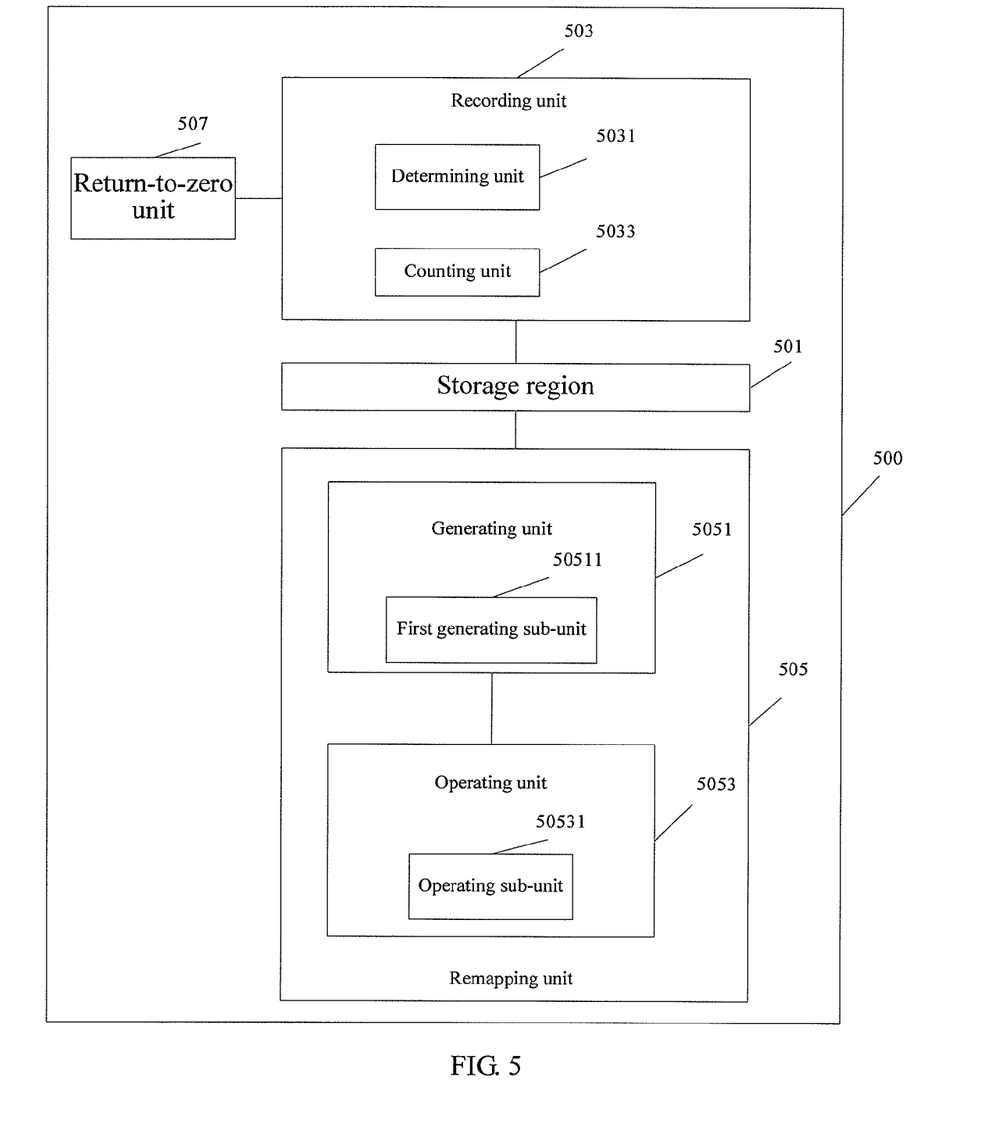
FIG. 5 is a schematic structural diagram of a storage device according to a fifth embodiment of the present invention.

FIG. 5 is a schematic structural diagram of a storage device according to a fifth embodiment of the present invention. As shown in FIG. 5, the storage device 500 may include:

a storage region 501, where the storage region includes a plurality of storage sub-regions of the same size, each storage sub-region includes a plurality of storage blocks of the same size, each storage block corresponds to one logical address and one physical address, there is a unique mapping between the logical address and the physical address, and a storage medium of the storage region may be a phase-change memory, a flash memory, or the like;

a recording unit 503, configured to record the accumulated number of write operations of each storage sub-region; and a remapping unit 505, configured to, when the accumulated number of write operations of any one storage sub-region of the plurality of storage sub-regions reaches a predetermined remapping rate, map a logical address of the storage sub-region to a remapping physical address.

Specifically, the remapping unit 505 may include:

a generating unit 5051, configured to generate a remapping key for the storage sub-region; and an operating unit 5053, configured to perform an XOR operation on the logical address of the storage sub-region and the remapping key to obtain a remapping physical address of the storage sub-region, thereby implementing mapping of the logical address of the storage sub-region to the remapping physical address.

Specifically, a logical address of a storage block in a storage sub-region may include a storage sub-region key and a storage block key, where the storage sub-region key may be used to identify the storage sub-region, and the storage block key may be used to identify the storage block in the storage sub-region.

Specifically, the generating unit 5051 may include:

a first generating sub-unit 50511, configured to generate a remapping key for the storage sub-region, where the number of bits of the remapping key is the same as the number of bits of the logical address of the storage block in the storage sub-region.

The operating unit 5053 may include:

an operating sub-unit 50531, configured to perform an XOR operation on a logical address of each storage block in the storage sub-region and the remapping key to obtain a remapping physical address of each storage block, thereby implementing mapping of the logical address of the storage sub-region to the remapping physical address.

Specifically, the logical address of the storage block in the storage sub-region may be represented by a binary number string MA whose length is $Log_2N$, and consecutive $Log_2(N/n)$ bits in the binary number string MA are a storage sub-region key, and consecutive $Log_2n$ bits in the binary number string MA are a storage block key, where N is the total number of storage blocks in a storage region, and n is the number of storage blocks in each storage sub-region.

The first generating sub-unit 50511 may specifically be configured to generate a remapping key for the storage sub-region, where the length of the remapping key is $\log_2 N$.

The operating sub-unit 50531 may specifically be configured to perform an XOR operation on a logical address MA of each storage block in the storage sub-region and the remapping key Key to obtain a remapping physical address RMA of each storage block, that is, RMA=MA XOR Key, where XOR represents the XOR operation.

Specifically, the recording unit 503 may include:

a determining unit 5031, configured to determine, according to an address of a storage block that corresponds to each write operation, a storage sub-region to which the storage block belongs; and a counting unit 5033, configured to record the accumulated number of write operations of the storage sub-region.

Specifically, the storage device 500 further includes:

a return-to-zero unit 507, configured to return the accumulated number of write operations of the storage sub-region to zero, and instruct the storage sub-region to enter a next remapping round.

Specifically, the remapping unit 505 may further be configured to, when the storage sub-region enters the next remapping round, generate a new remapping key of the current remapping round for the storage sub-region, and when the new remapping key is the same as a remapping key of a previous remapping round, perform an XOR operation on a logical address of the storage sub-region and the remapping key to obtain a remapping physical address of the storage sub-region in the current remapping round.

Specifically, the remapping unit 505 may further be configured to, when the storage sub-region enters the next remapping round, generate a new remapping key for the storage sub-region, and when the new remapping key is different from the remapping key of the previous remapping round, determine whether the remapping physical address of the storage sub-region in the current remapping round is the same as a remapping physical address of a partner storage sub-region of the storage sub-region; and if the two are the same, update a remapping key of the partner storage sub-region according to the remapping key of the storage sub-region to obtain an updated remapping key of the partner storage region; and determine the remapping physical address of the partner storage sub-region according to the updated remapping key of the partner storage sub-region.

In this embodiment of the present invention, address remapping of a plurality of storage sub-regions may be simultaneously performed. If remapping of all storage blocks in one storage sub-region is completed, the storage sub-region immediately enters a next remapping round and continues to be remapped. In this embodiment of the present invention, the address remapping of the plurality of storage sub-regions is concurrently performed in a multi-way manner, so that a wear-leveling speed may be faster.

With the storage device in this embodiment of the present invention, a logical address of a local data block on which too many write operations are performed may be mapped to an overall physical, storage region, thereby avoiding that local data is too hot and prolonging a service life of a storage medium.

Figure 6:
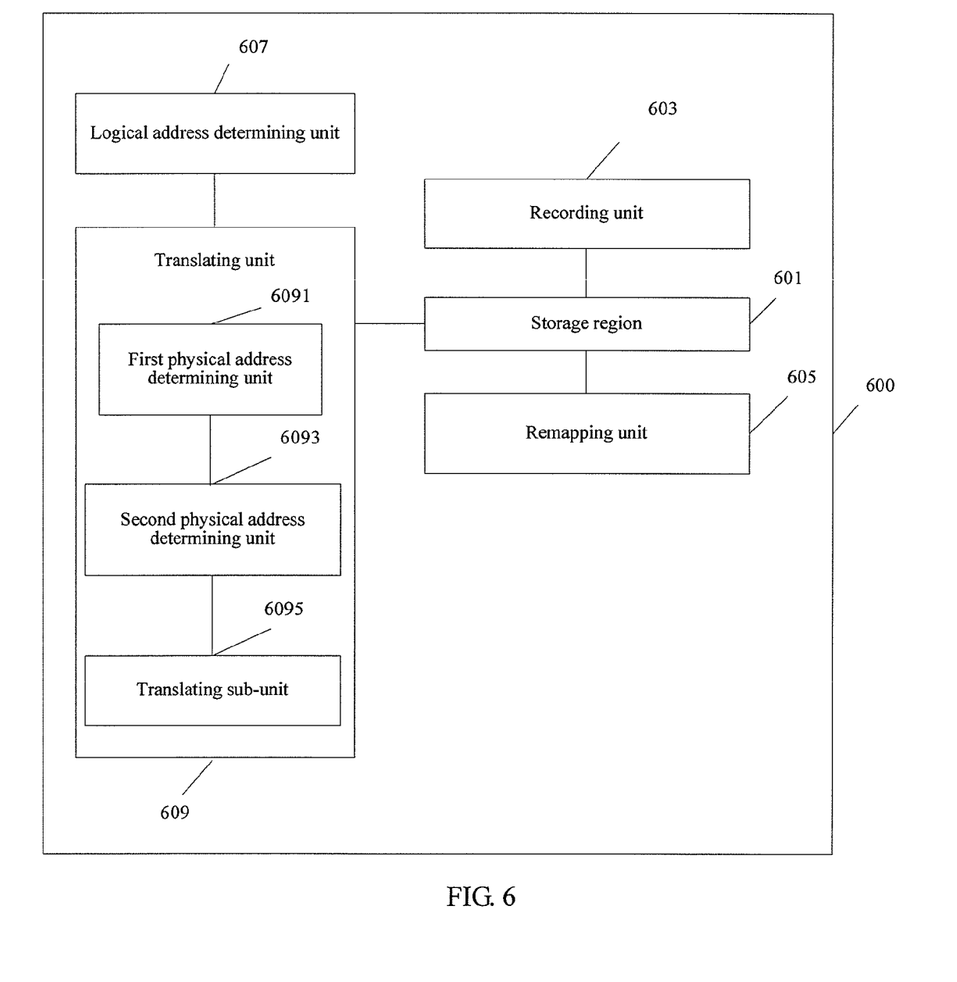
FIG. 6 is a schematic structural diagram of a storage device according to a sixth embodiment of the present invention.

FIG. 6 is a schematic structural diagram of a storage device according to a sixth embodiment of the present invention. The storage device in the sixth embodiment of the present invention is improved based on the storage device in the fifth embodiment. As shown in FIG. 6, in addition to a storage region 601, a recording unit 603, and a remapping unit 605, the storage device 600 may further include:

a logical address determining unit 607, configured to determine a logical address of a storage sub-region to which an access operation address belongs; and a translating unit 609, configured to translate the logical address of the storage sub-region into a physical block address.

Specifically, the translating unit 609 may include:

a first physical address determining unit 6091, configured to determine a physical address to which the logical address of the storage sub-region is mapped in a previous remapping round;

a second physical address determining unit 6093, configured to determine a physical address to which the logical address of the storage sub-region is mapped in a current remapping round; and a translating sub-unit 6095, configured to, if address remapping of the storage sub-region or a partner storage sub-region of the storage sub-region is completed in the current remapping round, determine that the physical block address that is obtained after the translation is the physical address to which the logical address of the storage sub-region is mapped in the current remapping round; otherwise, determine that the physical block address that is obtained after the translation is the physical address to which the logical address of the storage sub-region is mapped in the previous remapping round.

In this embodiment of the present invention, the accumulated number of write operations of each storage sub-region is recorded, and when the accumulated number of write operations of any one storage sub-region of a plurality of storage sub-regions reaches a predetermined remapping rate, a logical address of the storage sub-region is mapped to a remapping physical address. When the storage sub-region is accessed, the logical address of the storage sub-region is translated into the corresponding remapping physical address, thereby implementing translation of the logical address of the storage sub-region after the remapping and completing an access operation.

Figure 7:
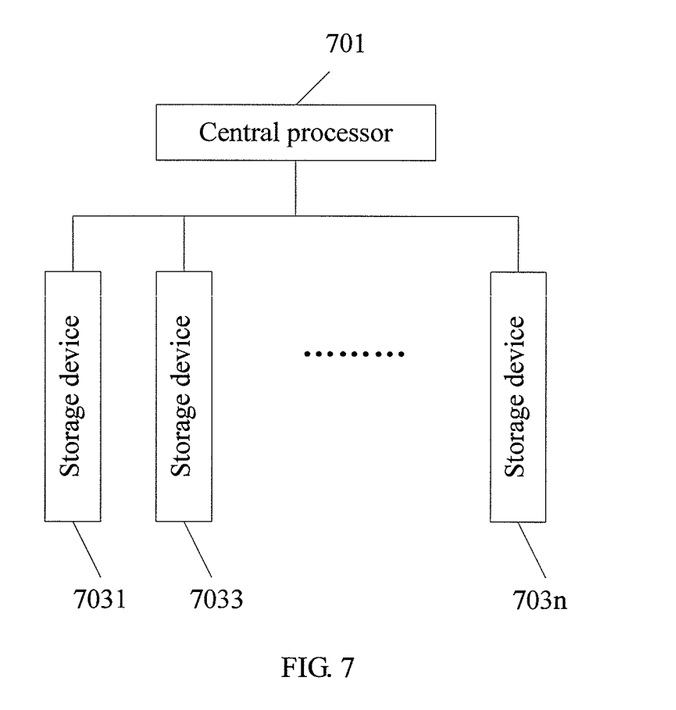
FIG. 7 is a schematic structural diagram of an information system according to a seventh embodiment of the present invention.

FIG. 7 is a schematic structural diagram of an information system according to the seventh embodiment of the present invention. As shown in FIG. 7, the information system 700 may include a central processor 701 and at least one storage device 7031, . . . , and 703n as described in the fifth embodiment and the sixth embodiment, where a storage medium of the storage device is a phase-change memory, a flash memory, or the like, where the central processor 701 is configured to control the storage device 7031, . . . , and 703n; and the storage device 7031, . . . , and 703n is configured to store or access information according to an instruction of the central processor 701.

The information system may be integrated in a server, telecommunication system, a network system, a data center, and consumer electronic products such as a computer and a mobile terminal.

In this embodiment of the present invention, address remapping of a plurality of storage sub-regions may be simultaneously performed. If remapping of all storage blocks in one storage sub-region is completed, the storage sub-region immediately enters a next remapping round and continues to be remapped. In this embodiment of the present invention, the address remapping of the plurality of storage sub-regions is concurrently performed in a multi-way manner, so that a wear-leveling speed may be faster.

With the storage device in the information system in this embodiment of the present invention, a logical address of a local data block on which too many write operations are performed may be mapped to an overall physical storage region, thereby avoiding that local data is too hot and prolonging a service life of the storage device.

Persons of ordinary skill in the art may understand that, all or part of the steps of the foregoing method embodiments may be implemented by a program instructing relevant hardware. The foregoing program may be stored in a computer readable storage medium. When the program is run, the steps included in the foregoing method embodiments are performed. The foregoing storage medium may be any medium capable of storing program codes, such as a ROM, a RAM, a magnetic disk, or an optical disk.

Finally, it should be noted that the foregoing embodiments are merely intended for describing the technical solutions of the present invention rather than limiting the present invention. Although the present invention is described in detail with reference to the foregoing embodiments, persons of ordinary skill in the art should understand that they may still make modifications to the technical solutions described in the foregoing embodiments or make equivalent replacements to some technical features of the technical solutions, as long as these modifications or equivalent replacements do not cause the essence of corresponding technical solutions to depart from the spirit and scope of the technical solutions in the embodiments of the present invention.

What is claimed is:

1. A wear-leveling method, wherein a storage region is divided into a plurality of storage sub-regions of a same size, each storage sub-region is divided into a plurality of storage blocks of a same size, each storage block corresponds to one logical address and one physical address, and there is a unique mapping between the logical address and the physical address, wherein the logical address of a storage block in a storage sub-region comprises a storage sub-region key and a storage block key, the storage sub-region key is used to identify the storage sub-region, and the storage block key is used to identify the storage block in the storage sub-region, the logical address of a storage block in a storage sub-region is represented by a binary number string MA whose length is $Log2N$, consecutive $Log2(N/n)$ bits in the binary number string MA are the storage sub-region key, and consecutive $Log2n$ bits in the binary number string MA are the storage block key, wherein N is the total number of storage blocks in the storage region, and n is the number of storage blocks in each storage sub-region; and the method comprises:
recording the accumulated number of write operations of each storage sub-region; and
when the accumulated number of write operations of any one storage sub-region of the plurality of storage sub-regions reaches a predetermined remapping rate, mapping a logical address of the storage sub-region to a remapping physical address, comprising,
generating a remapping key for the storage sub-region, wherein the length of the remapping key is $Log2N$, and
performing an exclusive-or (XOR) operation on a logical address MA of each storage block in the storage sub-region and the remapping key (Key) to obtain a remapping physical address (RMA) of each storage block according to RMA=MA XOR Key.

2. The method according to claim 1, wherein recording the accumulated number of write operations of each storage sub-region comprises:
determining, according to an address of a storage block that corresponds to each write operation, a storage sub-region to which the storage block belongs, and recording the accumulated number of write operations of the storage sub-region.

3. The method according to claim 1, wherein after mapping the logical address of the storage sub-region to the remapping physical address, the method further comprises:
returning the accumulated number of write operations of the storage sub-region to zero, wherein the storage sub-region enters a next remapping round.

4. The method according to claim 3, further comprising:
after the storage sub-region enters the next remapping round, generating a new remapping key of the current remapping round for the storage sub-region, and when the new remapping key is the same as a remapping key of a previous remapping round, performing an XOR operation on the logical address of the storage sub-region and the remapping key to obtain a remapping physical address of the storage sub-region in the current remapping round.

5. The method according to claim 3, further comprising:
after the storage sub-region enters the next remapping round, generating a new remapping key for the storage sub-region;
when the new remapping key is different from a remapping key of a previous remapping round, determining whether a remapping physical address of the storage sub-region in the current remapping round is the same as a remapping physical address of a partner storage sub-region of the storage sub-region;
if the two are the same, updating a remapping key of the partner storage sub-region according to the remapping key of the storage sub-region to obtain an updated remapping key of the partner storage sub-region; and
determining the remapping physical address of the partner storage sub-region according to the updated remapping key of the partner storage sub-region.

6. The method according to claim 1, wherein after performing address remapping on the storage sub-region, the method further comprises:
determining a logical address of a storage sub-region to which an access operation address belongs; and
translating the logical address of the storage sub-region into a physical block address.

7. The method according to claim 6, wherein translating the logical address of the storage sub-region into the physical block address comprises:
determining a physical address to which the logical address of the storage sub-region is mapped in a previous mapping round;
determining a physical address to which the logical address of the storage sub-region is mapped in a current remapping round; and
when address remapping of the storage sub-region or a partner storage sub-region of the storage sub-region is completed in the current remapping round, determining that the physical block address that is obtained after the translation is the physical address to which the logical address of the storage sub-region is mapped in the current remapping round; otherwise, determining that the physical block address that is obtained after the translation is the physical address to which the logical address of the storage sub-region is mapped in the previous remapping round.

8. A storage device, comprising:
a storage region, wherein the storage region comprises a plurality of storage sub-regions of a same size, each storage sub-region comprises a plurality of storage blocks of a same size, each storage block corresponds to one logical address and one physical address, and there is a unique mapping between the logical address and the physical address, wherein the logical address of a storage block in a storage sub-region comprises a storage sub-region key and a storage block key, the storage sub-region key is used to identify the storage sub-region, and the storage block key is used to identify the storage block in the storage sub-region, the logical address of the storage block in a storage sub-region is represented by a binary number string MA whose length is Log2N, consecutive Log2(N/n) bits in the binary number string MA are a storage sub-region key, and consecutive Log2n bits in the binary number string MA are a storage block key, wherein N is the total number of storage blocks in the storage region, and n is the number of storage blocks in each storage sub-region;

a recording unit, configured to record the accumulated number of write operations of each storage sub-region; and a remapping unit, configured to, when the accumulated number of write operations of any one storage sub-region of the plurality of storage sub-regions reaches a predetermined remapping rate, map a logical address of the storage sub-region to a remapping physical address, wherein the remapping unit comprises:

a generating unit, configured to generate a remapping key for the storage sub-region, wherein the length of the remapping key is Log2N, and an operating unit, configured to perform an exclusive-or (XOR) operation on the logical address of the storage sub-region and the remapping key to obtain a remapping physical address of the storage sub-region, thereby implementing mapping of the logical address of the storage sub-region to the remapping physical address, wherein the operating unit comprises:

an operating sub-unit, configured to perform an XOR operation on a logical address MA of each storage block in the storage sub-region and the remapping key (Key) to obtain a remapping physical address (RMA) of each storage block according to RMA=MA XOR Key.

9. The storage device according to claim 8, wherein the recording unit comprises:

a determining unit, configured to determine, according to an address of a storage block that corresponds to each write operation, a storage sub-region to which the storage block belongs; and a counting unit, configured to record the accumulated number of write operations of the storage sub-region.

10. The storage device according to claim 8, further comprising:

a return-to-zero unit, configured to return the accumulated number of write operations of the storage sub-region to zero, and instruct the storage sub-region to enter a next remapping round.

11. The storage device according to claim 10, wherein the remapping unit is further configured to, when the storage sub-region enters the next remapping round, generate a new remapping key of the current remapping round for the storage sub-region, and when the new remapping key is the same as a remapping key of a previous remapping round, perform an XOR operation on the logical address of the storage sub-region and the remapping key to obtain a remapping physical address of the storage sub-region in the current remapping round.

12. The storage device according to claim 10, wherein the remapping unit is further configured to, when the storage sub-region enters the next remapping round, generate a new remapping key for the storage sub-region, and when the new remapping key is different from a remapping key of a previous remapping round, determine whether a remapping physical address of the storage sub-region in the current remapping round is the same as a remapping physical address of a partner storage sub-region of the storage sub-region; and if the two are the same, update a remapping key of the partner storage sub-region according to the remapping key of the storage sub-region to obtain an updated remapping key of the partner storage region, and determine the remapping physical address of the partner storage sub-region according to the updated remapping key of the partner storage sub-region.

13. The storage device according to claim 8, further comprising:

a logical address determining unit, configured to determine a logical address of a storage sub-region to which an access operation address belongs; and a translating unit, configured to translate the logical address of the storage sub-region into a physical block address.

14. The storage device according to claim 13, wherein the translating unit comprises:

a first physical address determining unit, configured to determine a physical address to which the logical address of the storage sub-region is mapped in a previous remapping round;

a second physical address determining unit, configured to determine a physical address to which the logical address of the storage sub-region is mapped in a current remapping round; and a translating sub-unit, configured to, when address remapping of the storage sub-region or a partner storage sub-region of the storage sub-region is completed in the current remapping round, determine that the physical block address that is obtained after the translation is the physical address to which the logical address of the storage sub-region is mapped in the current remapping round; otherwise, determine that the physical block address that is obtained after the translation is the physical address to which the logical address of the storage sub-region is mapped in the previous remapping round.

15. An information system, comprising a central processor and at least one storage device according to claim 8, wherein the central processor is configured to control the storage device, and the storage device is configured to store or access information according to an instruction of the central processor.

* * * * *